United States Patent

[11] 3,575,584

[72] Inventors Carl J. Goodhouse
 Litchfield;
 Paul T. Flumm, Oakville, Conn.
[21] Appl. No. 866,247
[22] Filed Oct. 14, 1969
[45] Patented Apr. 20, 1971
[73] Assignee Robertshaw Controls Company
 Richmond, Va.

[54] CONTROL SYSTEM AND UNIT FOR A COOKING APPARATUS AND THE LIKE
 23 Claims, 20 Drawing Figs.
[52] U.S. Cl. ................................................ 219/492
[51] Int. Cl. ................................................ H05b 1/02
[50] Field of Search ........................................ 219/492;
 236/46

[56] References Cited
 UNITED STATES PATENTS
 2,556,450  6/1951  Schulze ................... 219/492X
 2,778,914  1/1957  Vallorani .................. 219/492X
 3,358,121  12/1967 Bowling ................... 219/492X
 3,358,924  12/1967 Goodhouse et al. ......... 219/492X
Primary Examiner—Harold Broome
Assistant Examiner—F. E. Bell
Attorneys—Auzville Jackson, Jr., Robert L. Marben and Candor, Candor & Tassone ABSTRACT: A control unit having a thermostatically operated switch means adapted to interconnect and disconnect an electrical source to and from a heating means of a cooking oven to tend to maintain a selected temperature output when the switch means is moved from an off position thereof to a selected on position thereof, a timer operated switch means and a relay switch means each having first and second positions whereby the relay switch means and the timer operated switch means are adapted when in their first positions thereof to interconnect the source to the heating means through the thermostatically operated switch means. The timer operated switch means is adapted to cause the relay switch means to move to its second position when the timer operated switch means automatically moves to its second position, the timer operated switch means and the relay switch means being adapted to maintain the relay switch means in its second position even though the timer operated switch means automatically moves back to its first position after the lapse of a selected cooking time period until the thermostatically operated switch means is turned to its off position so that the relay switch means can automatically move back to its first position. The relay switch means when in its second position providing for a warmth retaining and noncooking operation of the heating means, or for a nonoperating condition of the heating means.

INVENTORS
CARL J. GOODHOUSE
PAUL T. FLUMM

THEIR ATTORNEYS

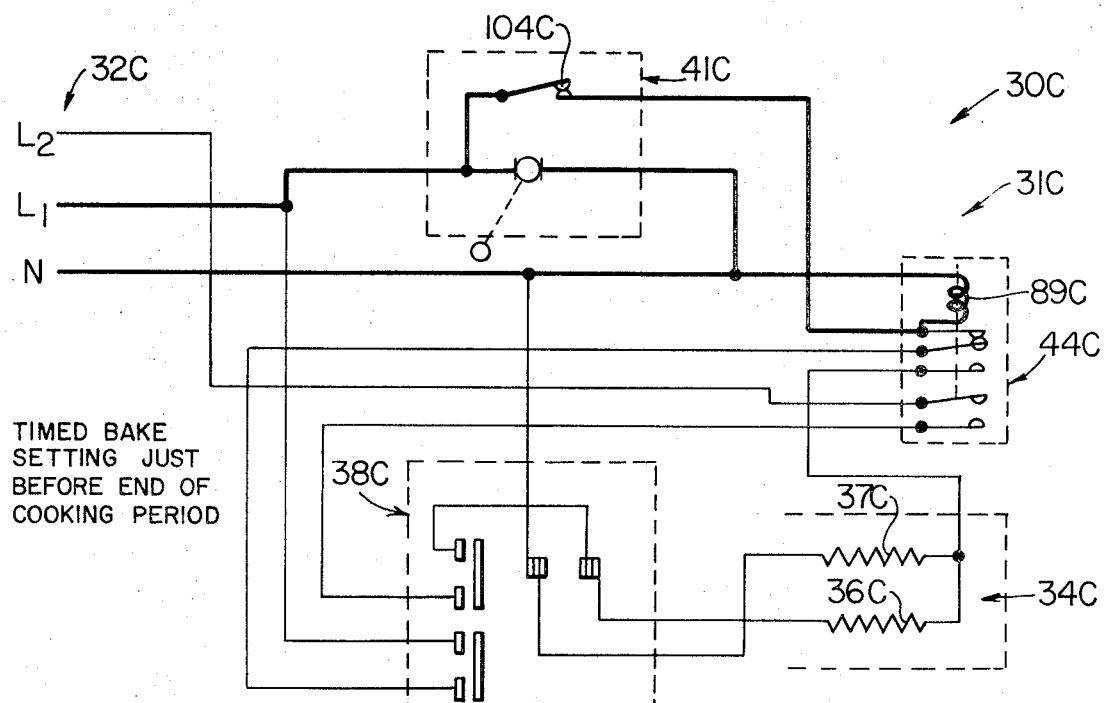
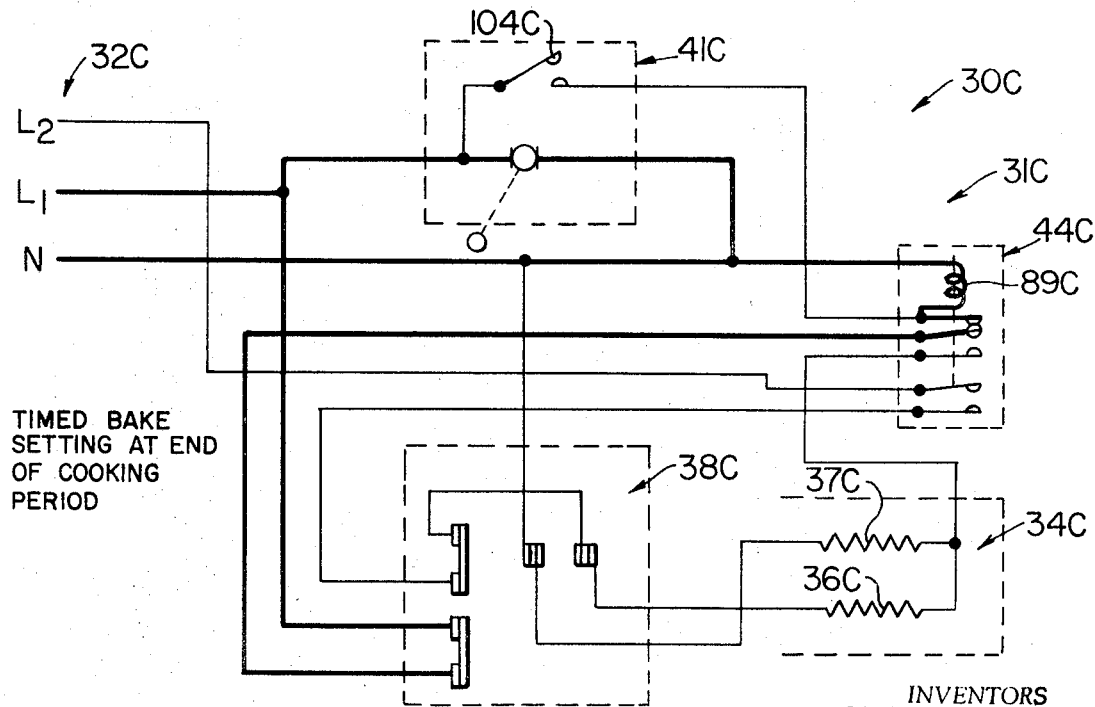

3,575,584

CONTROL SYSTEM AND UNIT FOR A COOKING APPARATUS AND THE LIKE

This invention relates to an improved control system for a cooking oven or the like as well as to an improved control unit for such a system or the like.

It is well known that electrical control systems have been provided for electrical heating means of a cooking apparatus or the like so that the operator can preselect a cooking time period for the oven which is to begin after the lapse of a preselected time delay period, such control system after the lapse of the cooking time period automatically causing the heating means to maintain the oven at a noncooking but warmth retaining temperature so that the cooked food will remain in the oven at a palatable temperature and can be served at any time after the lapse of the cooking period.

For example, see U.S. Pat. No. 3,358,924 for one type of control unit for providing the above function.

One of the features of this invention is to provide another type of control unit wherein the unit does not require the manual resetting of the timer means thereof after the same has performed the above timed cooking operation to set the control system for a subsequent manual operation of the unit.

In particular, one embodiment of this invention provides a control unit for a cooking oven having heating means and a source of electrical current, the unit comprising a thermostatically operated switch means adapted to interconnect and disconnect the source to and from the heating means to tend to maintain the selected temperature output of the heating means in the oven when the thermostatically operated switch means is moved from an off position thereof to a selected on position thereof, such as to a baking position or to a broiling position. The unit also includes a timer operated switch means having a first position and a second position, the timer operated switch means having means for maintaining itself in its first position for a selected cooking time period and for automatically moving itself to its second position at the end of the time period and then back to its first position. The unit also includes a relay switch means having a first position and a second position, the electrical circuit means of the unit being adapted to operatively interconnect the source with the heating means through the various switch means of the unit. The relay switch means and the timer operated switch means are adapted when in the first positions thereof to cooperate together to interconnect the source to the heating means through the thermostatically operated switch means when the thermostatically operated switch means is in an on position thereof, the timer operated switch means having means adapted to cause the relay switch means to move to its second position when the timer operated switch means automatically moves to its second position at the end of a preselected cooking time period. At this time, the timer operated switch means and the relay switch means are adapted to cooperate together to thereafter maintain the relay switch means in its second position even though the timer operated switch means thereafter automatically moves back to its first position until the thermostatically operated switch means is subsequently turned to its off position by the selector means thereof whereby the relay switch means then is adapted to automatically move back to its first position. When the relay switch means is moved to and is maintained in its second position, such relay switch means is adapted to either cause the heating means of the oven to maintain a noncooking but warmth retaining temperature in the oven or to completely prevent the operation of the heating means thereof.

Accordingly, it is an object of this invention to provide an improved control system for a cooking oven or the like having one or more of the novel features set forth above or hereinafter shown or described.

Another object of this invention is to provide an improved control unit for a cooking oven or the like, the control unit of this invention having one or more of the novel features set forth above or hereinafter shown or described.

Other objects, uses and advantages of this invention are apparent from a reading of this description which proceeds with reference to the accompanying drawings forming a part thereof and wherein:

FIG. 19 is a view similar to FIG. 17 and illustrates the control system thereof just before the end of a timed bake cooking period.

FIG. 20 is a view similar to FIG. 19 and illustrates the system of FIG. 17 at the end of the timed bake cooking period.

Figure 1:
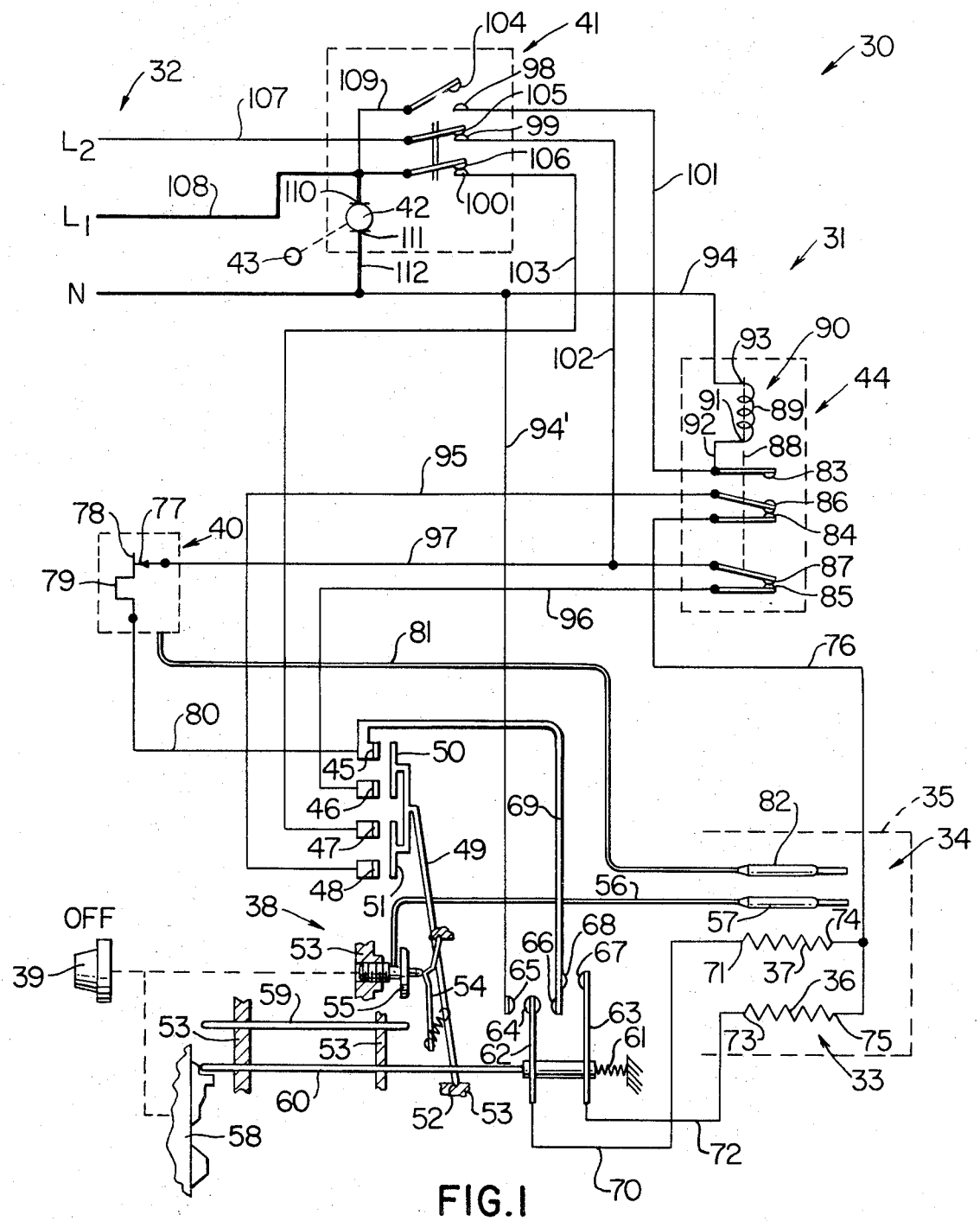
FIG. 1 is a schematic view illustrating one embodiment of the control system of this invention, the control unit for such system being disposed in its off position.

While the various features of this invention are hereinafter described and illustrated as being particularly adapted to provide a warmth retaining and noncooking temperature or a complete termination of the operation of the heating means following a preselected timed cooking operation of the oven, it is to be understood that the control means of this invention can provide for other functions of the heating means of the cooking oven as desired, such as for other cooking temperatures or the like.

Therefore, this invention is not to be limited to only the embodiments illustrated in the drawings, because the drawings are merely utilized to illustrate some of the wide variety of uses of this invention.

Referring now to FIG. 1, one control system of this invention is generally indicated by the reference numeral 30 and comprises a control unit of this invention that is generally indicated by the reference numeral 31 for interconnecting an electrical power source 32 to electrical heating means 33 disposed in a cooking oven 34 of a cooking apparatus 35 in a manner hereinafter described, the control unit 31 being schematically illustrated in FIG. 1 with the understanding that the control unit can comprise a self-contained arrangement which can be interconnected to the power source 32 and to the heating means 33 by external terminal means thereof.

The electrical power source 32 comprises a conventional three line 220-volt arrangement provided by two power lines $L_1$ and $L_2$ and a neutral line N. The heating means 33 for the oven 34 comprises conventional heating elements 36 and 37 so arranged in the oven 34 that the heating element 36 comprises a bake element and the heating element 37 comprises a broil element.

The control unit 31 of this invention for the system 30 comprises a first thermostatically operated switch means generally indicated by the reference numeral 38 and having a manual selector means 39, a second thermostatically operated switch means generally indicated by the reference numeral 40 for providing a warmth retaining and noncooking temperature in the oven 34 in a manner hereinafter described, a timer operated switch means generally indicated by the reference numeral 41 and including a continuously running synchronous timer motor 42 utilized for operating a clock and a gear mechanism to be engaged by the switch mechanism and a manual selector means 43 for setting the switch mechanism and for engaging the gear mechanism, and a relay switch means generally indicated by the reference numeral 44.

THERMOSTATICALLY OPERATED SWITCH MEANS 38

Figure 2:
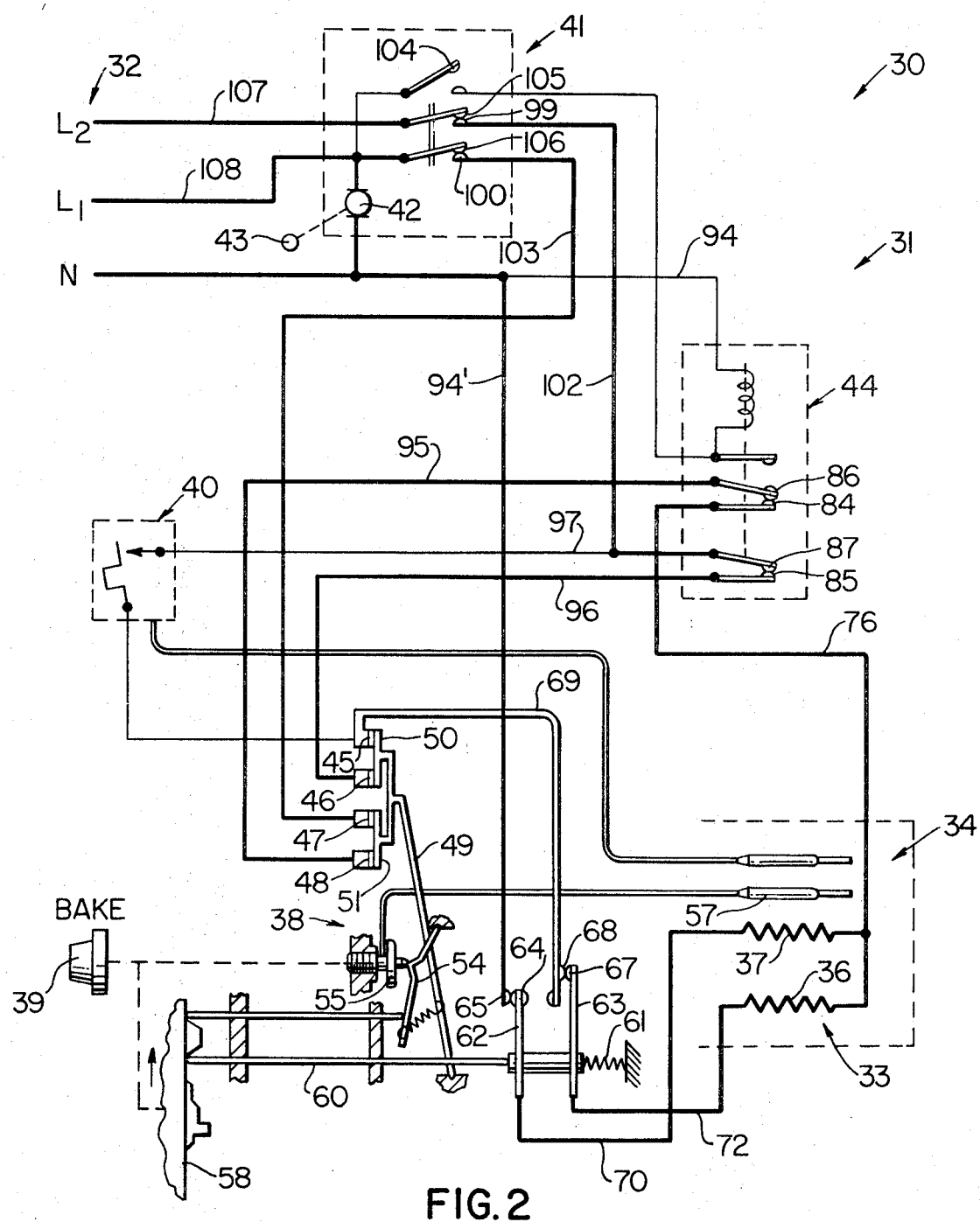
FIG. 2 is a view similar to FIG. 1 and illustrates the control system in a baking position thereof, the energized electrical lines of the system being illustrated by heavy lines in FIG. 2 as well as in the other FIGS.

The thermostatically operated switch means 38 includes two pairs of fixed electrical contacts 45, 46 and 47, 48 and a movable lever means 49 carrying two contact bridging members 50 and 51 with the bridging member 50 being adapted to electrically interconnect the contacts 45 and 46 together when disposed thereagainst as illustrated in FIG. 2 and with the bridging member 51 being adapted to electrically interconnect the contacts 47 and 48 together when disposed thereagainst as illustrated in FIG. 2. The lever member 49 is fulcrumed at 52 on frame means 53 of the control unit 38 and its position relative to the fixed contacts 45—48 is controlled by cooperating lever means 54 positioned by an expansible and contractable power element 55 adjustable carried by the frame means 53 and having its position adjusted by the control knob 39. The interior of the power element 55 is interconnected by a conduit means 56 to a temperature sensing bulb 57 disposed in the oven 34 whereby when the selector knob 39 is turned from its off position to any on position thereof, the power element 55 is so positioned relative to the frame means 53 to cause the lever means 54 and 49 to maintain the bridging members 50 and 51 respectively against the pairs of fixed contacts 45, 46 and 47, 48 as long as the temperature sensing bulb 57 is sensing a temperature output in the oven 34 below the selected temperature setting of the control knob 39. However, when the temperature sensing bulb 57 senses that the temperature output effect in the oven 34 is above the selected temperature setting of the knob 39, the power element 55 has expanded to such a position that the lever means 54 and 49 maintain the bridging members 50 and 51 respectively away from the fixed contacts 45—48 as illustrated in FIG. 1 until the temperature effect in the oven 34 again falls below the selected temperature setting of the knob 39.

Rotation of the control knob 39 between its various positions also controls the rotational position of a cam carrying member 58 which operates push rods 59 and 60 that re are axially movable in the frame means 53 of the unit 38.

Figure 3:
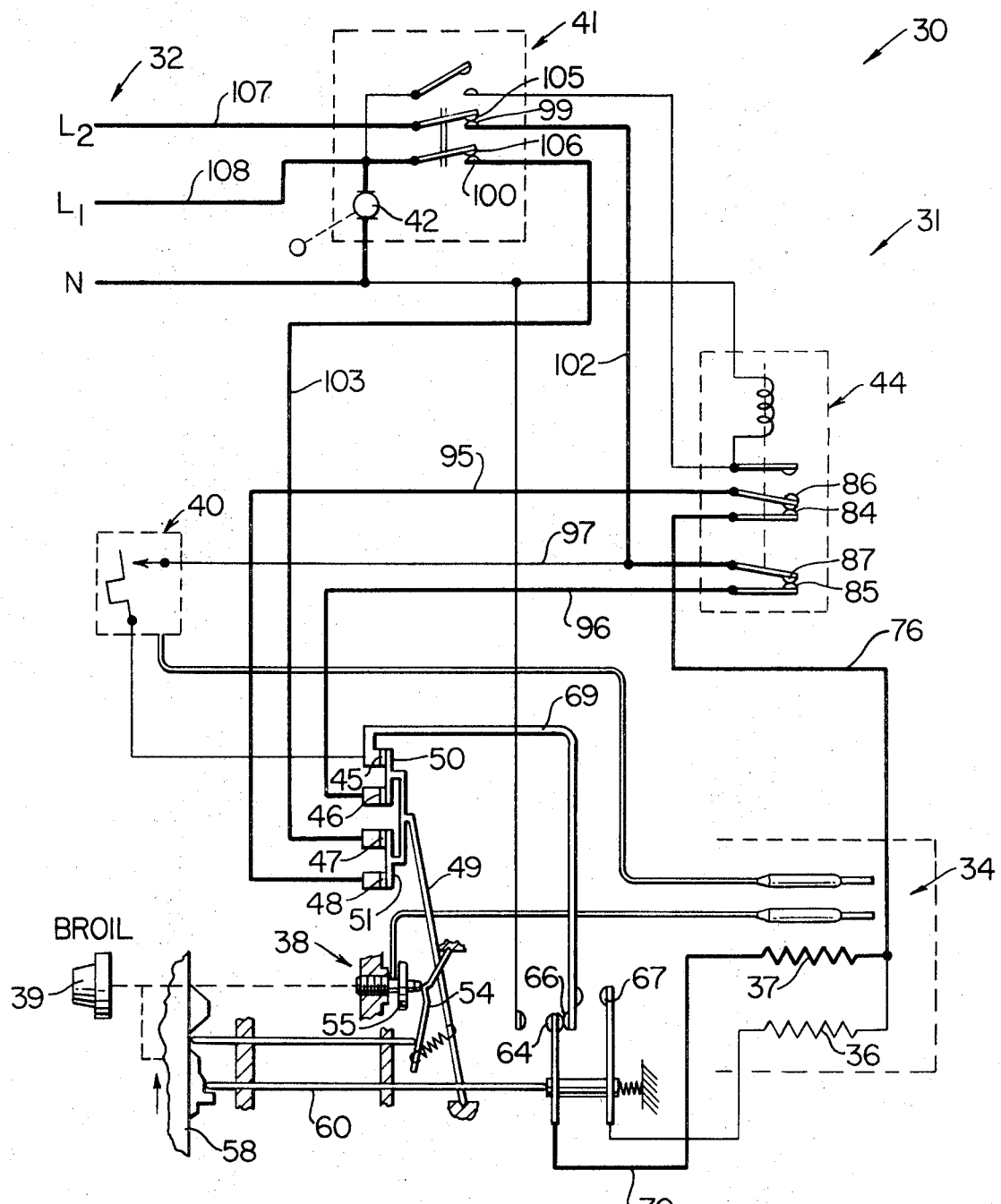
FIG. 3 is a view similar to FIG. 1 and illustrates the system in its broiling position.

The push rod 60 is biased toward the cam member 58 by a spring means 61 and carries two switch blades 62 and 63 electrically insulated from each other so that the switch blades 62 and 63 have Their positions adjusted by the cam member 58. The switch blade 62 carries contact means 64 cooperable with a fixed contact 65 of the unit 38 and with another fixed contact 66 of the unit 38 that is spaced from the fixed contact 65, a the movable contact 64 being so constructed and arranged that the same can be disposed intermediate the fixed contacts 65 and 66 as illustrated in FIG. 1 or against the contact 65 as illustrated in FIG. 3 for a purpose hereinafter described. Similarly, the switch blade 63 carries an electrical contact 67 adapted to cooperate with a fixed contact 68 of the unit 38 that is electrically interconnected to the fixed contact 66 and to the fixed contact 45 by an electrical connector 69 for a purpose hereinafter described whereby the movable contact 67 can be disposed out of contact with the contact 68 as illustrated in FIG. 1 or against the same as illustrated in FIG. 2 depending upon the position of the cam member 58 as controlled by the selection knob 39.

The switch blade 62 is electrically interconnected by a lead 70 to one side 71 of the broil element 37 while the switch blade 63 is interconnected by lead 72 to one side 73 of the bake element 36, the other sides 74 and 75 of the broil element 37 and the bake element 36 being electrically interconnected together by a lead 76.

For further details of the structure and operation of the thermostatically operated switch means 38 when utilized in an oven control system, see U.S. Pat. No. 2,943,177.

THERMOSTATICALLY OPERATED SWITCH MEANS 40

The thermostatically operated switch means 40 includes a fixed contact 77 and a movable contact 78 carried by a switch blade 79 electrically interconnected by a lead 80 to the fixed contact 45 of the thermostatically operated switch means 38, the switch blade 79 being operated by a power element (not shown) similar to the element 55 and having its interior fluidly interconnected by a conduit means 81 to a temperature sensing bulb 82 disposed in the oven 34. The power element of the thermostatically operated switch means 40 can be factory set or manually adjustable as desired. However, such power element is so constructed and arranged that the same will move the switch blade 79 away from the fixed contact 77 when the temperature sensing bulb 82 senses a temperature in the oven 34 above a warmth retaining and noncooking temperature, such as between 140° F. and a 170° F. depending upon the setting of the power element thereof. Conversely, when the temperature of the oven 34 falls below the noncooking and warmth retaining temperature setting of the power element of the switch means 40, the power element causes the switch blade 79 to close against the fixed contact 77 as illustrated in FIG. 1.

RELAY SWITCH MEANS 44

Figure 5:
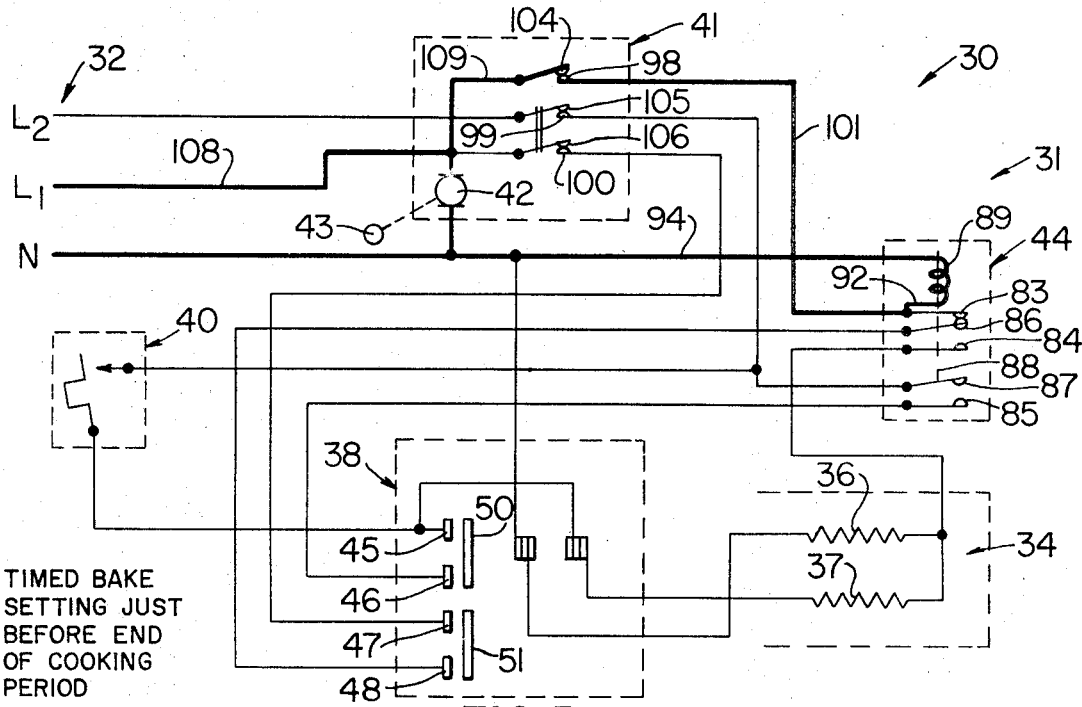
FIG. 5 is a view similar to FIG. 1 and illustrates the control system just before the end of a timed bake cooking period.

The relay switch means 44 includes three fixed contacts 83, 84 and 85 and two movable contacts 86 and 87 interconnected to a plunger means 88 operated by a solenoid coil 89, the plunger means 88 and coil 89 comprising a solenoid means 90 of the relay switch means 44. When the solenoid means 90 is in an unenergized condition as illustrated in FIG. 1, the plunger means 88 maintains the movable contact 86 against the fixed contact 84 and the movable contact 87 against the fixed contact 85. However, when the coil 89 is energized, such as is illustrated in FIG. 5, the plunger means 88 moves the movable contact 86 out of contact with the fixed contact 84 and into contact with the fixed contact 83 and moves the movable contact 87 out of contact with the fixed contact 85 so as to be disposed in an open position as illustrated in FIG. 5.

One side 91 of the solenoid coil 89 is interconnected by a lead 92 to the fixed contact 83, the other side 93 of the solenoid coil 89 being interconnected to the line N of the power source 32 by an electrical lead 94 that is also interconnected to the fixed contact 65 of the switch 38 by a lead 94'.

The movable contact 86 of the relay switch means 44 is interconnected by a lead 95 to the fixed contact 48 of the thermostatically operated switch means 38. The fixed contact 85 is interconnected by a lead 96 to the fixed contact 46 of the thermostatically operated switch means 38. The fixed contact 84 is interconnected to the leas 76 that is interconnected to the sides 74 and 75 of the heating elements 37 and 36. The movable contact 87 is interconnected by a lead 97 to the fixed contact 77 of the thermostatically operated switch means 40.

TIMER OPERATED SWITCH MEANS 41

The timer operated switch means 41 includes three fixed contacts 98, 99 and 100, the contact 98 being interconnected by a lead 101 to the fixed contact 83 of the relay switch means 44, the fixed contact 99 being interconnected by a lead 102 to the lead 97 and the fixed contact 100 being interconnected by a lead 103 to the fixed contact 47 of the thermostatically operated switch means 38.

The timer operated switch means 41 also includes three movable contacts 104, 105 and 106 respectively cooperable with the fixed contacts 98, 99 and 100 in a manner hereinafter described, the movable contact 105 being interconnected by a lead 107 to the power source line $L_2$ and the movable contact 106 being interconnected by lead 108 to the power source line $L_1$. The movable contact 104 is interconnected by a lead 109 not only to the lead 108 but also to one side 110 of the timer motor 42, the other side 111 of the timer motor 42 being interconnected by a lead 112 to the lead 94 that is interconnected to the neutral line N of the power source 32 whereby the timer motor 42 is always placed across the source lines $L_1$ and N so as to be continuously running to operate the normal clock mechanism of the cooking apparatus 35.

The timer means 42 and the selector means 43 for setting the timer switches and for engaging the gear train of the timer means 42 are so constructed and arranged that when the selector means 43 is in an off or manual position thereof, the selector means 43 is out of engagement with the gear mechanism of the timer motor means 42 and maintains the movable contacts 105 and 106 into electrical contact with the fixed contacts 99 and 100 with the movable contact 104 being held out of electrical contact with the fixed contact 98.

However, when the selector means 43 is adjusted so as to provide a delayed start of a preselected cooking time, the selector means 43 holds the movable contacts 105 and 106 out of contact with the fixed contacts 99 and 100 with the contact 104 also being held out of contact with the fixed contact 98.

The movable contacts 104, 105 and 106 remain in their open position during the entire delayed start period effected by the selector means 43 and at the lapse of the delayed start period, the timer mechanism 42 causes the selector means 43 to close the movable contacts 105 and 106 against the fixed contacts 99 and 100 with the movable contact 104 remaining in the open position as illustrated in FIG. 1 with such movable contacts 104, 105, 106 remaining in the position illustrated in FIG. 1 during the entire preselected timed cooking period. However, just prior to the end of the timed cooking period, the selector means 43 through the gear means momentarily moves the movable contact 104 to a closed position against the fixed contact 98 as illustrated in FIG. 5. Thereafter, the timer mechanism 42 automatically returns the movable contact 104 back to the position illustrated in FIG. 1 or 6 while moving the selector means 43 to its off or manual position so that the housewife or the like will not have to subsequently set the selector means 43 in its off or manual position following a timed cooking operation as will be apparent hereinafter.

OPERATION OF THE CONTROL SYSTEM 30 AND CONTROL UNIT 31

With the selector knob 43 of the timer means 42 disposed in its off or manual position and with the selector knob 39 of the thermostatically operated switch means 38 disposed in its off position as illustrated in FIG. 1, not only are the switch blades 105 and 106 of the timer operated means 41 disposed in electrical contact with the fixed contacts 99 and 100 of the timer operated switch means 41, but also the contact 104 is disposed in its open position so that the coil means 89 of the solenoid means 90 remains unenergized whereby the contacts 84, 86 and 85, 87 are in contact with each other. However, current cannot flow to the heating means 36 and 37 because the power element 55 of the switch means 38 is in such a position relative to the frame means 53 that the lever means 54 and 49 maintain the bridging members 50 and 51 out of contact with the respective pairs of contacts 45, 46 and 47, 48 as illustrated in FIG. 1 regardless of the temperature being sensed by the bulb 57 in the oven 34.

Should the housewife or the like desire to utilize the oven 34 for a conventional baking operation without utilizing the timer switch means 41, the housewife merely turns the selector knob 39 to the desired baking temperature setting thereof as illustrated in FIG. 2 whereby the cam member 58 is so adjusted that the spring 61 moves the movable contacts 64 and 67 respectively into electrical contact with the fixed contacts 65 and 68 of the thermostatically operated switch means 38 as illustrated in FIG. 2. Since the oven 34 is below the temperature effect setting of the control knob 39, the power element 55 has been adjusted by the selector knob 39 to such a position that the lever means 54 and 49 hold the bridging means 50 and 51 respectively into electrical contact with the pairs of contacts 45, 46 and 47, 48 as illustrated in FIG. 2 whereby current is supplied to the heating means 33.

In particular, the bake element 36 is placed across the power lines $L_1$ and $L_2$ during a demand for heat by the power element 55 as current flows from power line $L_1$, lead 108, closed contacts 106 and 100, lead 103, bridged contacts 47 and 48, lead 95, closed contacts 86 and 84, lead 76, bake element 36, lead 72, closed contacts 67 and 68, conductor 69, bridged contacts 45 and 46, lead 96, closed contacts 85, 87, lead 91, lead 102, closed contacts 99 and 105, and lead 107 to power source line $L_2$ whereby the bake element 36 will be heating the oven 34 at full rate of power thereof as long as the power element 55 is demanding heat. The broil element 37 is also being supplied electrical current 32 but in such a manner that the same is operated at only part of its rated power as the element 37 is placed only across the power source lead $L_1$ and neutral line N. In particular, it has been previously described that the power source lead $L_1$ is interconnected to the lead 76 whereby lead 76 is interconnected to the neutral line N through broil element 37, lead 70, closed contacts 64 and 65, lead 94' and lead 94.

In this manner, the elements 36 and 37 are supplied electrical current to heat the oven 34 to the temperature setting of the knob 39. When the temperature sensing bulb 57 senses the temperature in the oven 34 has reached the selected temperature, the power element 55 has expanded to such a position that the same operates the lever means 54 and 49 to open the bridging members 50 and 51 away from the pairs of contacts 45, 46 and 47, 48 whereby both power lines $L_1$ and $L_2$ are disconnected from the heating elements 36 and 37.

When the temperature in the oven 34 subsequently falls below the temperature setting of the control knob 39, the power element 55 has collapsed to such a condition that the lever means 54 and 49 again places the bridging members 50 and 51 against the respective pair of contacts 45, 46 and 47, 48 so that the heating elements 36 and 37 are again energized in the manner illustrated in FIG. 2.

Thus, as long as the selector knob 39 is set at a desired bake setting position thereof, the power element 55 cycles the heating elements 36 and 37 on and off to tend to maintain the temperature in the oven 34 at the selected temperature.

When the housewife desires to terminate the previously described baking operation, she merely turns the selector knob 39 to the off position where the cam member 58 shoves the rod means 60 to the right in FIG. 2 to the position illustrated in FIG. 1 whereby not only are the movable contacts 64 and 67 moved out of contact with the fixed contacts 65 and 68 as illustrated in FIG. 1, but also the power element 55 is adjusted to a position to cause the lever means 54 and 49 to maintain the bridging members 50 and 51 in their open positions regardless of the temperature in the oven 34.

When the housewife or the like desires to utilize the control system 30 for performing a broiling operation in the oven 34 without a timed operation thereof, the housewife merely turns the selector knob 39 to its broil position as illustrated in FIG. 3 whereby not only does the control knob 39 adjust the position of the power element 55 to a high temperature setting thereof, but also the cam means 58 moves the rod 60 further to the right and causes the movable contact 64 to be placed into electrical contact with the fixed contact 68 as illustrated in FIG. 3. Thus, since the oven 34 is at a temperature below the broil temperature setting of the selector knob 39, the power element 55 is in a collapsed condition causing the lever means 54 and 49 to place the bridging members 50 and 51 against the respective pairs of contacts 45, 46 and 47, 48 as illustrated in FIG. 3 whereby the broil element 37 is placed across the power source leads $L_2$ and $L_1$.

In particular, the power source lead $L_2$ is interconnected to the lead $L_1$ by lead 107, closed contacts 105 and 99, lead 102, lead 97, closed contacts 87 and 85, lead 96, bridged contacts 46 and 45, connector 69, closed contacts 66 and 64, lead 70, broil element 37, lead 76, closed contacts 84 and 86, lead 95, bridge contacts 48 and 47, lead 103, closed contacts 100 and 106, and lead 108. However, the bake element 36 is not supplied electrical current because the movable contact 67 is in an open position so that current cannot flow through the bake element 36.

Thus, as long as the temperature of the oven 34 remains below the broil setting of the selector knob 39, the broil element 37 is supplied current at its full rated power. However, when the temperature of the oven 34 exceeds the setting of the selector knob 39 in its broil position, the power element 55 expands to such a position that the same causes the lever means 54 and 49 to move the bridging members 50 and 51 to an open position thereof so that the power source lines $L_1$ and $L_2$ are disconnected from the broil element 37.

In this manner, the power element 55 cycles the broil element 37 on and off to tend to maintain the temperature in the oven 34 at the broiling temperature setting of the selector knob 39 until the housewife or the like again turns the selector knob 39 to its off position.

Figure 4:
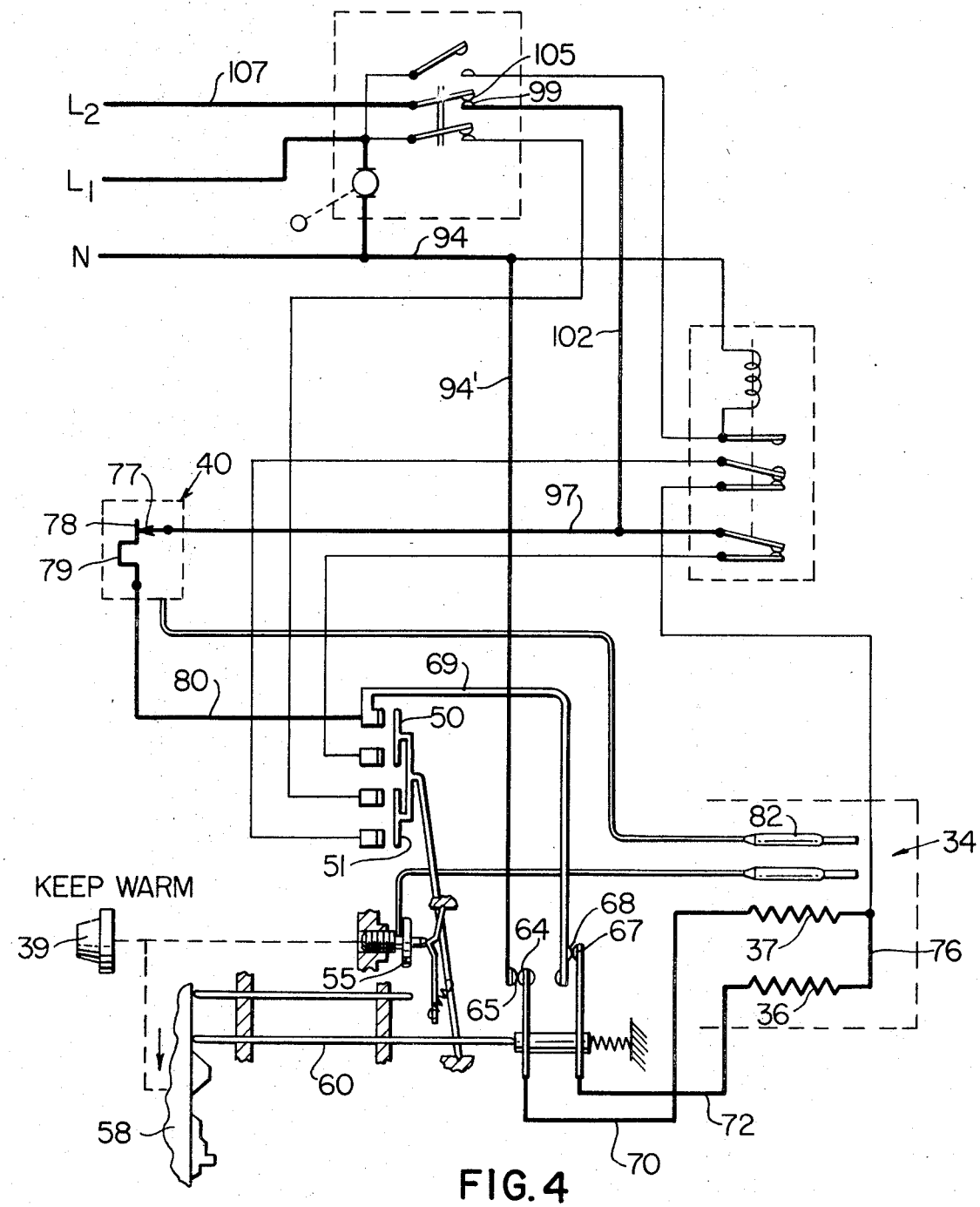
FIG. 4 is a view similar to FIG. 1 and illustrates the system in its noncooking but warmth retaining position.

Should the housewife or the like desire to utilize the oven 34 for merely a warming operation without having a cooking temperature therein, the housewife turns the selector knob 39 to its "keep warm" position whereby not only is the power element 55 adjusted to a position thereof that regardless of the temperature of the oven 34, the bridging members 50 and 51 will not close against their respective pairs of contacts 45, 46 and 47, 48 as illustrated in FIG. 4, but also the cam member 58 permits the rod 60 to be moved to the left so that the movable contacts 64 and 67 are respectively placed against the fixed contacts 65 and 68 whereby as long as the thermostatically operated switch means 40 demands heat in the oven 34, the heating elements 36 and 37 are in series across the power line $L_2$ and neutral line N so that the heating elements 36 and 37 supply heat for the oven 34 at only a small part of their rated powers so as to tend to maintain the temperature in the oven 34 at the low temperature setting of the thermostatic switch means 40 within a narrow differential thereof.

In particular, the power line $L_2$ is interconnected to the neutral line N by lead 107, closed contacts 105 and 99, lead 102, lead 97, closed contacts 77 and 78, switch blade 79, lead 80, conductor 69, closed contacts 68 and 67, lead 72, bake element 36, lead 76, broil element 37, lead 50, closed contacts 64 and 65, lead 94' and lead 94.

When the temperature in the oven 34 exceeds the temperature setting of the thermostatic switch means 40, as sensed by the temperature sensing bulb 82, the switch blade 79 is moved away from the fixed contact 77 to prevent the flow of current through the heating elements 36 and 37. However, when the temperature in the oven 34 again falls below the temperature setting of the thermostatic switch means 40, the switch blade 79 is again moved against the fixed contact 77 to again establish current flow through the heating means 36 and 37 in the manner previously described.

Thus, the thermostatic means 40 tends to maintain the temperature in the oven 34 at a low temperature as set by the thermostatic means 40 by cycling the movable contact 78 relative to the fixed contact 77 in the manner previously described until the housewife again turns the selector knob 39 to its off position so that the movable contacts 64 and 67 return to their open positions as illustrated in FIG. 1.

Should the housewife or the like desire to utilize the oven 34 for a timed baking operation to start the cooking of the fool sometime in the future, the housewife or the like first adjusts the selector knob 43 of the timer mechanism 42 to a delayed start position thereof, such as to start cooking two hours later, whereby such position of the selector knob 43 maintains all of the movable contacts 104, 105 and 106 of the timer operated switch means 41 in their open position during the delayed start period. The housewife then further adjusts the selector knob 43 so as to provide for a desired baking cooking time, such as for four hours. The housewife then sets the selector knob 39 at the desired baking temperature whereby even though such adjustment of the knob 39 causes the movable contacts 64 and 67 to respectively move against the fixed contacts 65 and 68 as illustrated in FIG. 2 and adjusts the power element 55 so that the same is demanding heat in the oven 34 and places the bridging members 50 and 51 against the respective pairs of contacts 45, 46 and 47, 48 as illustrated in FIG. 2, no current can be supplied to the heating means 36 and 37 because the power source leads $L_1$ and $L_2$ are respectively being prevented from being interconnected to the leads 102 and 103 by the opened contacts 105, 99 and 106, 100.

However, after the lapse of the present delayed time period, the timer mechanism 42 causes the timer operated switch means 41 to return to the position as illustrated in FIG. 2 whereby the movable contacts 105 and 106 are placed against the fixed contacts 99 and 100 so that the thermostatically operated switch means 38 will cause the oven 34 to tend to maintain the selected baking temperature therein in the manner previously described during the preselected time period.

Just before the timer mechanism 42 reaches the end of the preselected timed bake period, the timer mechanism 42 momentarily places the movable contact 104 against the fixed contact 98 as illustrated in FIG. 5 whereby the solenoid coil 89 of the relay switch means 44 is energized by being placed across the power source line $L_1$ and neutral line N as illustrated in FIG. 5.

In particular, the power source line $L_1$ is interconnected to the neutral line N through the solenoid coil 89 by lead 108, lead 109, closed contacts 104 and 98, lead 101, lead 92, coil 89, and lead 94 whereby the energized coil 89 pulls upwardly on the plunger 88 to open the contact 87 away from the contact 85 and open the contact 86 away from the contact 84 while placing the contact 86 against the contact 83 as illustrated in FIG. 5 whereby the power source leads $L_1$ and $L_2$ are completely disconnected from the heating elements 36 and 37.

Figure 6:
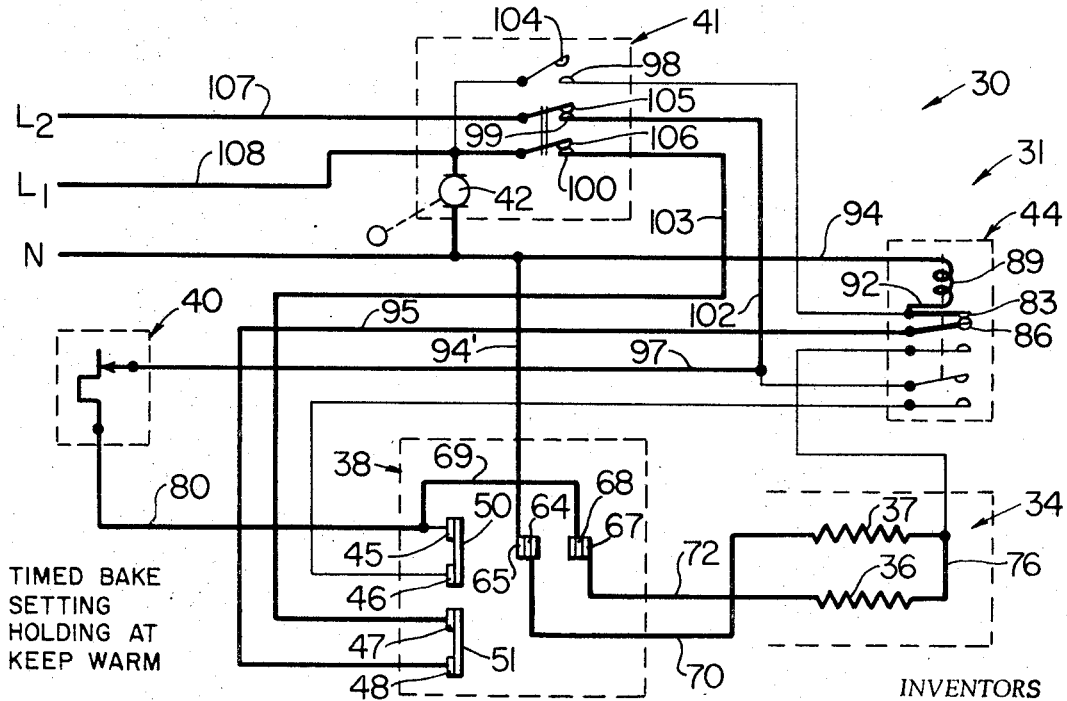
FIG. 6 is a view similar to FIG. 5 and illustrates the unit of the control system holding at a keep warm and noncooking temperature following the timed bake cooking period.

The timer mechanism 42 maintains the switch arrangement illustrated in FIG. 5 for a sufficient length of time for the temperature of the oven 34 to a fall below the bake temperature setting of the knob 39 so that the power element 55 will maintain the bridging members 50 and 51 against the respective pair of contacts 45, 46 and 47, 48 as illustrated in FIG. 6. With such condition, the timer mechanism 42 automatically returns the selector means 43 to its off position and thus opens the movable contact 104 away from the fixed contact 98 as illustrated in FIG. 6. However, under this condition, the solenoid coil 89 of the relay switch means 44 remains energized so that the heater means 36 and 37 are now placed in series across the power source line $L_2$ and neutral line N to tend to maintain the temperature in the oven 34 at the keep warm and noncooking temperature setting of the thermostatic means 40 until the housewife subsequently turns the selector knob 39 to its off position.

In particular, the solenoid coil 89 remains placed across the power source line $L_1$ and neutral line N by lead 108, closed contacts 106, 100, lead 103, now bridged contacts 47 and 48, lead 95, now closed contacts 86 and 83, lead 92, coil 89, and lead 94 whereby the solenoid coil 89 will remain energized after the lapse of a timed baking operation in an automatic manner until the housewife or the like turns the selector knob 39 back to its off position since the temperature in the oven 34 will never reach the temperature setting of the power element 55 as the heating elements 36 and 37 are now controlled for a low temperature operation thereof by the thermostatic switch means 40.

In particular, the heating elements 37 and 36 are placed in series across the power line $L_2$ and neutral line N by lead 107, closed contacts 105 and 99, lead 102, line 97, thermostatic switch construction 40 when demanding heat as illustrated in FIG. 6, lead 80, conductor 69, closed contacts 68 and 67, lead 72, bake element 36, lead 76, broil element 37, lead 70, closed contacts 64 and 65, , lead 94' and lead 94.

Therefore, the control system 30 maintains the temperature in the oven 34 at the keep warm and noncooking temperature setting of the thermostatic means 40 continuously after the lapse of the timed baking operation previously described until the housewife subsequently turns the selector knob 39 to its off position which causes the bridging members 50 and 51 to again move away from their respective pairs of contacts 45, 46 and 47, 48 so that the coil 89 of the relay switch means 44 is disconnected from across the power line $L_1$ and neutral line N whereby the relay switch construction 44 will return to the position illustrated in FIG. 1 and the control system 30 will be in the off position illustrated in FIG. 1.

In this manner, it can be seen that the timer means 42 does not have to be subsequently set to a manual or off position thereof following the previously described timed bake operation thereof as the same is self-clearing when the selector knob 39 is moved to its off position os that the oven 34 can be utilized for subsequent cooking operations in any desired manner without first requiring a manual setting of the timer means 42.

While the previously described timed operation provided by the timer means 42 utilized a delayed start period before the cooking operation occurred, it is to be understood that the timer means 42 could have been set for an immediate start of the preselected cooking period with the same operating to immediately start the baking operation and, after the lapse thereof, the timer mechanism 42 would function in the manner illustrated in FIGS. 5 and 6 and previously described to provide the warmth retaining and noncooking operation following the timed baking operation until the housewife turns the selector knob 39 to its off position.

The control system 30 is also adapted to provide a timed broiling operation with the selected time period for broiling operation either occurring immediately or occurring after the lapse of a preselected delayed start period as determined by the setting of the knob 43.

Figure 7:
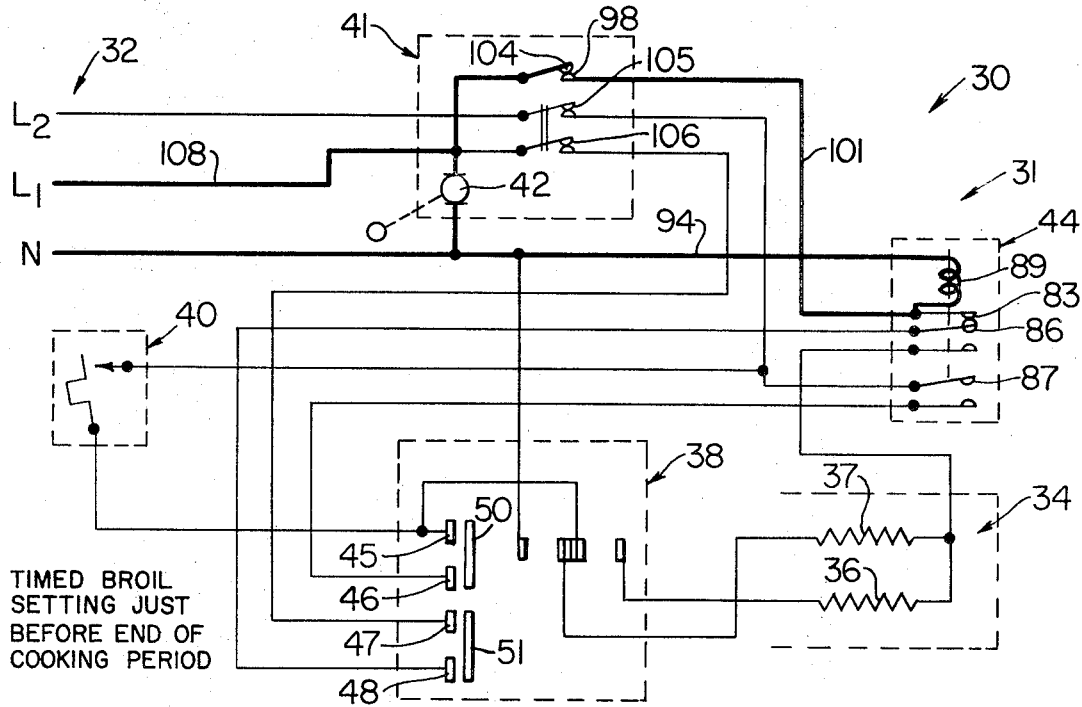
FIG. 7 is a view similar to FIG. 1 and illustrates the control system just before the end of a timed broil cooking period.
Figure 8:
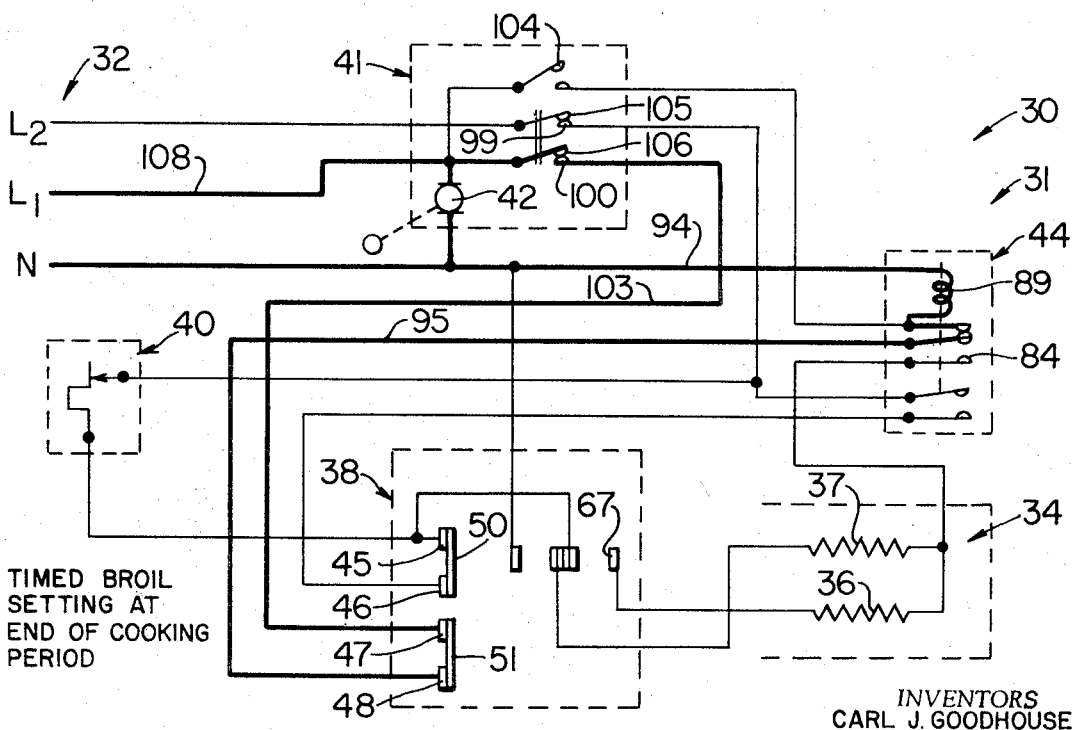
FIG. 8 is a view similar to FIG. 7 and illustrates the system at the end of the timed broil cooking period.
Figure 9:
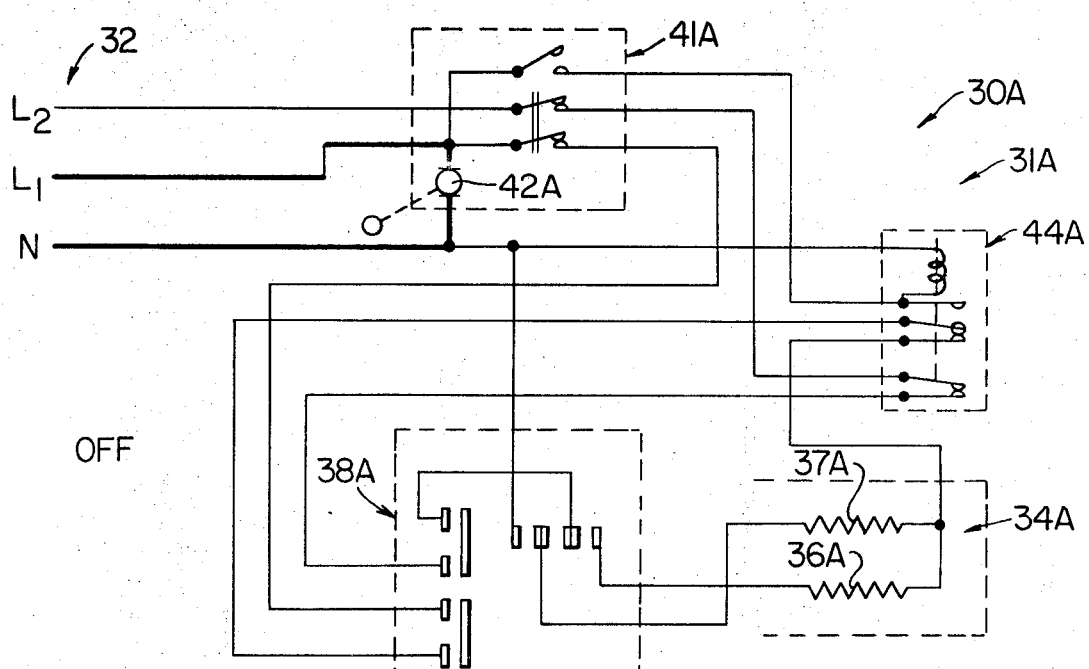
FIG. 9 is a schematic view of another control system of this invention, the control system of FIG. 9 being illustrated in its off position.

In any event, when the timed broiling operation occurs, the timer mechanism 42, in a manner similar to the previously described timed baking operation holds the switch means 42 in the position illustrated in FIG. 3 so that the broiling operation can take place for the preselected time period. However, just prior to the end of the timed broiling operation, the timer mechanism 42 moves the movable contact 104 to its closed position against the contact 98 as illustrated in FIG. 7 so that the solenoid coil 89 is placed across the power line $L_1$ and the neutral line N to cause the same to open the movable contact 87 and move the movable contact 86 against the fixed contact 83 as illustrated in FIG. 7 until after the temperature in the oven 34 falls below the broil temperature setting of the selector knob 39 whereby the bridging members 50 and 51 are respectively bridging the pairs of contacts 45, 46 and 47, 48 as illustrated in FIG. 8. At this time, the timer mechanism 42 again returns the switch means 41 to its normal off or manual position wherein the movable contact 104 is moved to its open position as illustrated in FIG. 8 whereby the solenoid coil 89 remains energized in the same manner as provided by the timed baking operation described in connection with FIG. 6 until the housewife or the like turns the selector knob 39 to its off position. However, until the housewife turns the selector knob 39 to its off position, the heating elements 36 and 37 remain unenergized during the operating condition of the control means 30 as illustrated in FIG. 8 as no current can flow through the heating means 37 and 36 since the contacts 84 and 67 are in an open condition thereof.

Therefore, it can be seen that the control system 30 and control unit 31 of this invention can provide normal operations of the oven 34 or preselected timed operations thereof, such timed operations either causing a cooking operation immediately or following a preselected delay start period. However, regardless of the timing operation provided, the timer mechanism automatically returns to its manual or off position without requiring further setting thereof after the timed operation so that the oven can subsequently be utilized in a conventional manner for other cooking operations, the control system 30 providing a continuous warmth retaining and noncooking operation in the oven following a timed baking operation thereof and preventing further heating of the oven following a timed broiling operation thereof.

CONTROL SYSTEM OF FIGURES 9—12

Another control system and control unit of this invention are respectively and generally indicated by the reference numerals 30A and 31A in FIGS. 9—12 with the parts thereof similar to the system 30 and unit 31 previously described being indicated by like reference numerals followed by the reference letter "A."

The only difference between the systems 20 and 30A, as well as between the control units 31 and 31A, is that the keep warm thermostatic switch construction 40 of FIG. 1 has been eliminated from the unit 31A and system 30A so that following a timed bake operation of the system 30A, the heating elements 36A and 37A remain in an unenergized condition.

Figure 10:
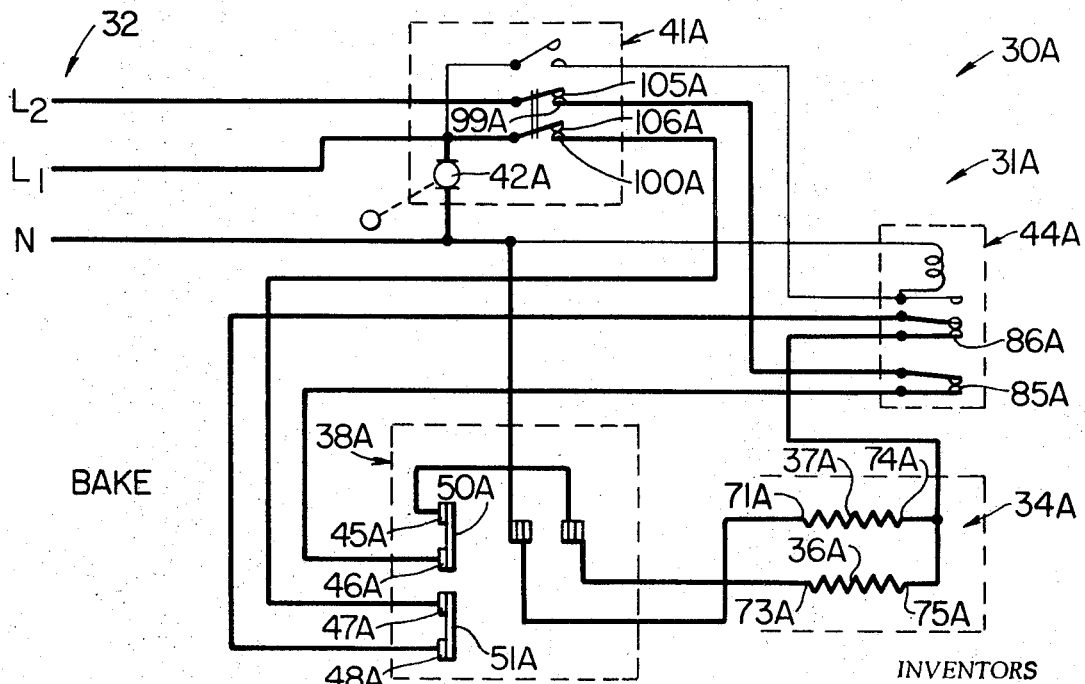
FIG. 10 is a view similar to FIG. 9 and illustrates the unit of FIG. 9 in its bake position.
Figure 11:
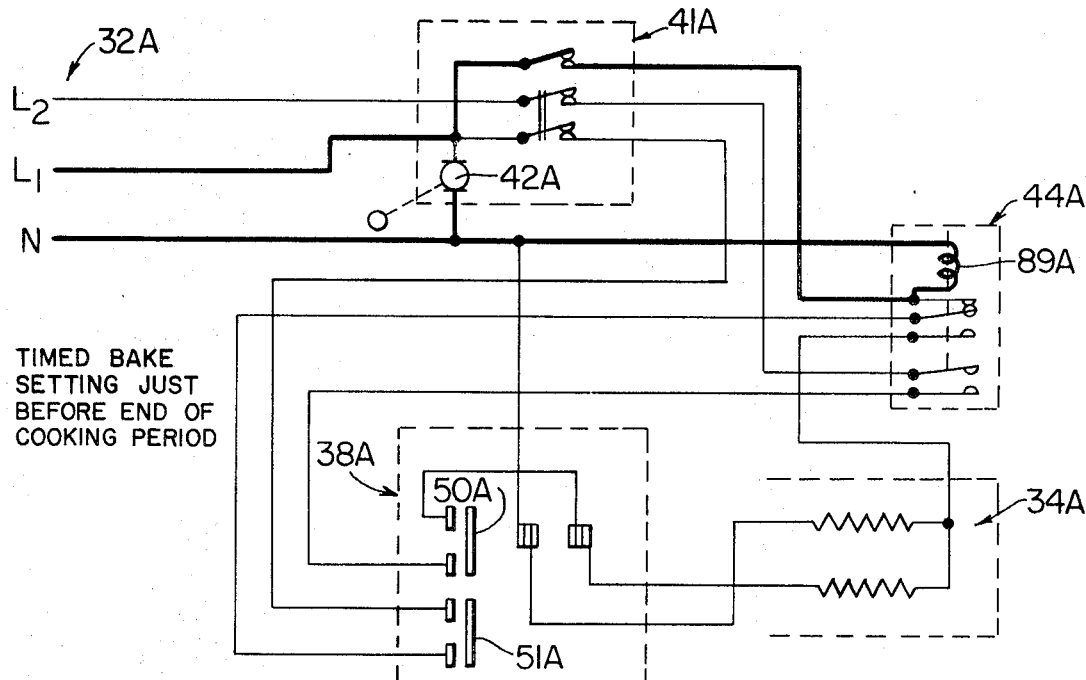
FIG. 11 is a view similar to FIG. 9 and illustrates the system of FIG. 9 just before the end of a timed bake cooking period.
Figure 12:
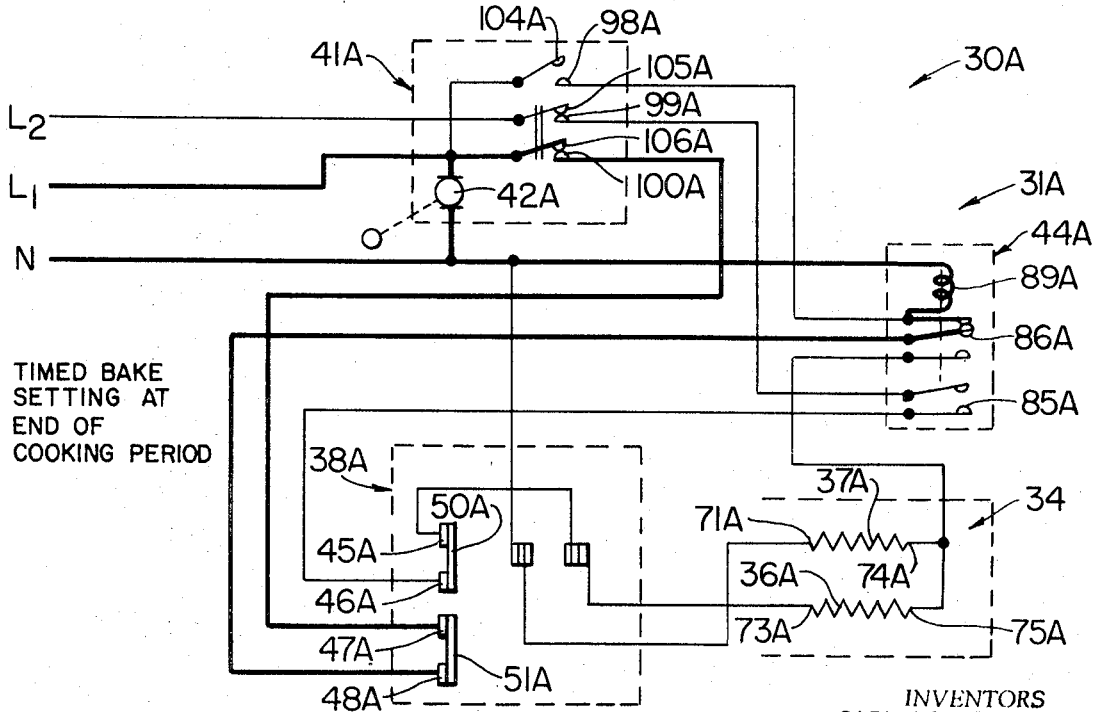
FIG. 12 is a view similar to FIG. 11 and illustrates the system of FIG. 9 at the end of the timed bake cooking period.
Figure 13:
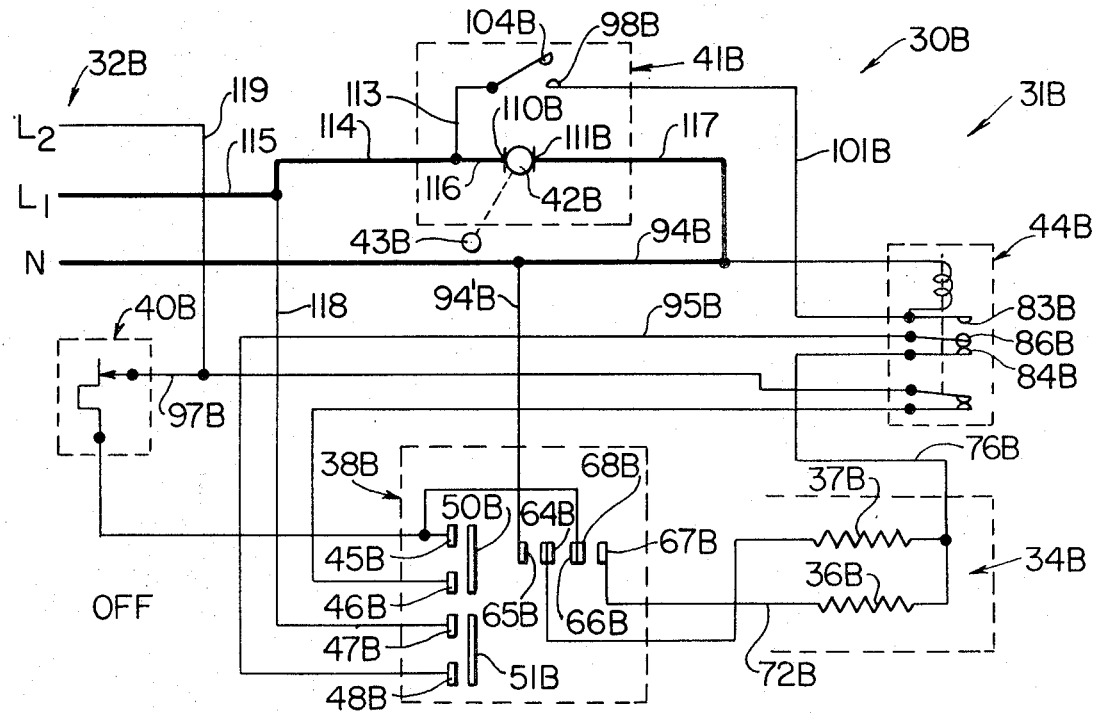
FIG. 13 is a view similar to FIG. 1 and illustrates another control system of this invention, the control system being illustrated in its off position.
Figure 14:
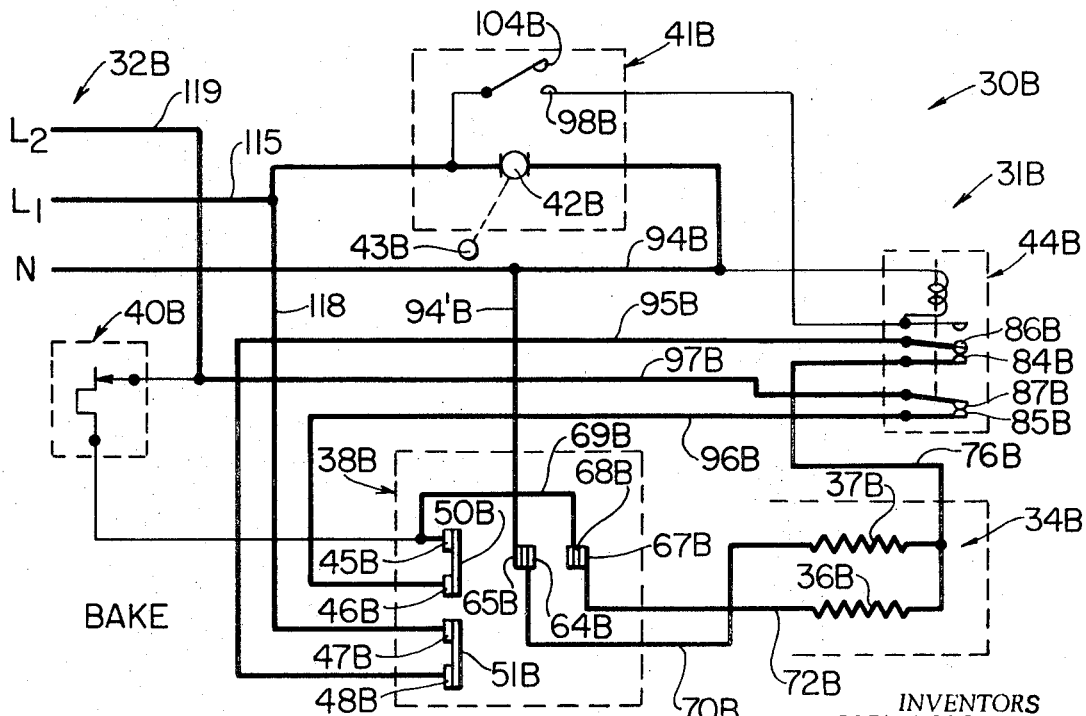
FIG. 14 is a view similar to FIG. 13 and illustrates the system of FIG. 13 in its bake position.

In particular, when the timer mechanism 42A is causing a timed bake operation as illustrated in FIG. 10, the thermostatic switch means 38A controls the heating element 36A and 37A in the manner previously described for the system 30 to tend to maintain the oven 34A at the selected baking temperature. At the end of the timed baking period, the timer mechanism 42A controls the timer operated switch means in the manner illustrated in FIG. 11 to energize the solenoid coil 89A in the manner previously described in such situation in FIG. 5 of the system 30 until after the bridging members 50A and 51A again close against their respective pairs of contacts 45A, 46A and 47A, 48A as illustrated in FIG. 12 whereby the timer mechanism 42A opens the contact 104A away from the fixed contact 98A so as to maintain the coil 89A in its energized condition across power lines $L_1$ and N in the same manner as the system 30 as previously described in connection with FIG. 6. However, as illustrated in FIG. 12, the heating elements 36A and 37A at the end of the timed bake operation will remain unenergized since the contact 86A is in its open position at the right hand end 75A and 74A of the heating elements 36A and 37A with the left hand end 73A of the bake element 36A being in an open condition at the contact 85A and the left hand end 71A of the broil element 37A merely being interconnected to the neutral line N.

Thus, it can be seen that the control system 30A and control unit 31A can perform all of the operations of the system 30 and unit 31 in the manner previously described for the system 30 and unit 31 except for having a keep warm operation following a timed baking operation and a keep warm position of the thermostatically operated switch means 38A.

3,575,584

CONTROL SYSTEM OF FIGS. 13—16

Another control system and control unit of this invention are respectively and generally indicated by the reference numerals 30B and 31B in FIGS. 13—16 with the various parts thereof that are similar to the system 30 and unit 31 being indicated by like reference numerals followed by the reference letter "B."

The timer operated switch means 41B of the unit 31B does not include the previously described movable contacts 105 and 106 and their cooperating fixed contacts 99 and 100 as the same only has the movable contact 104B and fixed contact 98B with the contact 98B being interconnected to the movable contact 83B of the relay switch means 44B by the previously described lead 101B and with the movable contact 104B being interconnected to the power source line $L_1$ by interconnecting leads 113, 114 and 115. The timer motor 42B has one side 110B interconnected to the juncture of the leads 113 and 114 by a lead 116 so as to be interconnected to the power source line $L_1$ and the other side 111B thereof being interconnected by a lead 117 to the lead 94B which is interconnected to the neutral line N so that the timer motor 42B is a continuously operating mechanism.

The fixed contact 47B of the thermostatically operated switch means 38B is interconnected by a lead 118 to the junction of the leads 115 and 114, the other contact means 45B, 46B, 48B, 65B, 64B, 66B, 68B and 67B being interconnected in the manner provided by the unit 31 previously described.

The keep warm thermostatic switch means 40B of the unit 31B has its lead 97B directly interconnected to the power source line $L_2$ by a lead 119.

Since the control system 30B and control unit 31B operates in substantially the same manner as the control system 30 and unit 31 thereof for all of the operations previously described for the system 30, except that the timer operated switch means 41B cannot provide a preselected timed delay period before a preselected timed cooking operation, only a timed bake operation will be described for the system 30B.

In particular, the timer operated switch means 41B is only adapted to momentarily close the movable contact 104B against the fixed contact 98B just prior to the end of a timed setting thereof as set by the selector means 43B thereof as will be apparent hereinafter.

For example, should the housewife or the like desire to utilize the control system 30B to cook food in the oven 34B for a predetermined time period, such as 2 hours, she sets the timer knob 43B to provide a 2 hour cooking period and sets the thermostatically operated switch means 38B to the desired bake temperature setting for the cooking period whereby the timer mechanism 42B begins to run and the heating elements 37B and 36B are energized by the thermostatically switch means 38B as long as a heat demand requirement for the oven 34B is sensed by the thermostatic switch construction 38B whereby the bake element 36B is placed across the power source leads $L_1$ and $L_2$ and the broil element 37B is placed across the power source line $L_1$ and neutral line N.

In particular, when the bridging members 50B and 51B are in their closed positions against their respective pairs of contacts 45B and 46B, and 47B, 48B, the bake element 36B is placed across the power source leads $L_1$ and $L_2$ by lead 115, lead 118, bridged contacts 47B and 48B, lead 95B, closed contacts 86B and 84B, lead 76B, heating element 36B, lead 72B, closed contacts 67B and 68B, connector 69B, bridged contacts 45B and 46B, lead 96B, closed contacts 85B and 87B, lead 97B and lead 119. The broil element 37B is placed across the power line $L_1$ and N by the lead 76B being interconnected to the power source line $L_1$, broil element 37B, lead 70B, closed contacts 64B and 65B, lead 94'B and lead 94B whereby the elements 36 and 37 are cycled on and off by 94B whereby the thermostatic switch means 38B to tend to maintain the baking temperature in the oven 34B throughout the timed baking operation.

Figure 15:
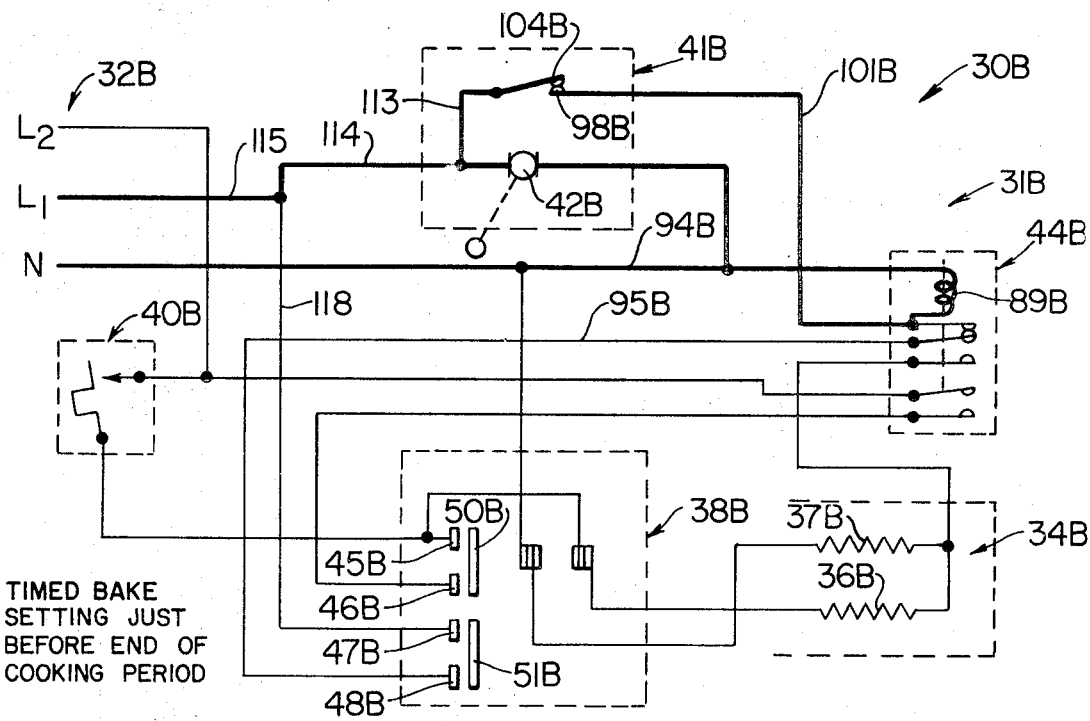
FIG. 15 is a view similar to FIG. 13 and illustrates the system of FIG. 13 just before the end of a timed bake cooking period.

Just prior to the end of the timed baking operation, the timer mechanism 42 momentarily closed the movable contact 104B against the fixed contact 98B as illustrated in FIG. 15 whereby the coil 89B of the relay switch means 44B is energized and placed across the power source lines $L_1$ and N by lead 115, lead 114, lead 113, closed contacts 104B and 98B, lead 101B, coil 89B and lead 94B. Thus, the operation of the heating elements 36B and 37B are terminated in the manner previously described for the system 30.

Figure 16:
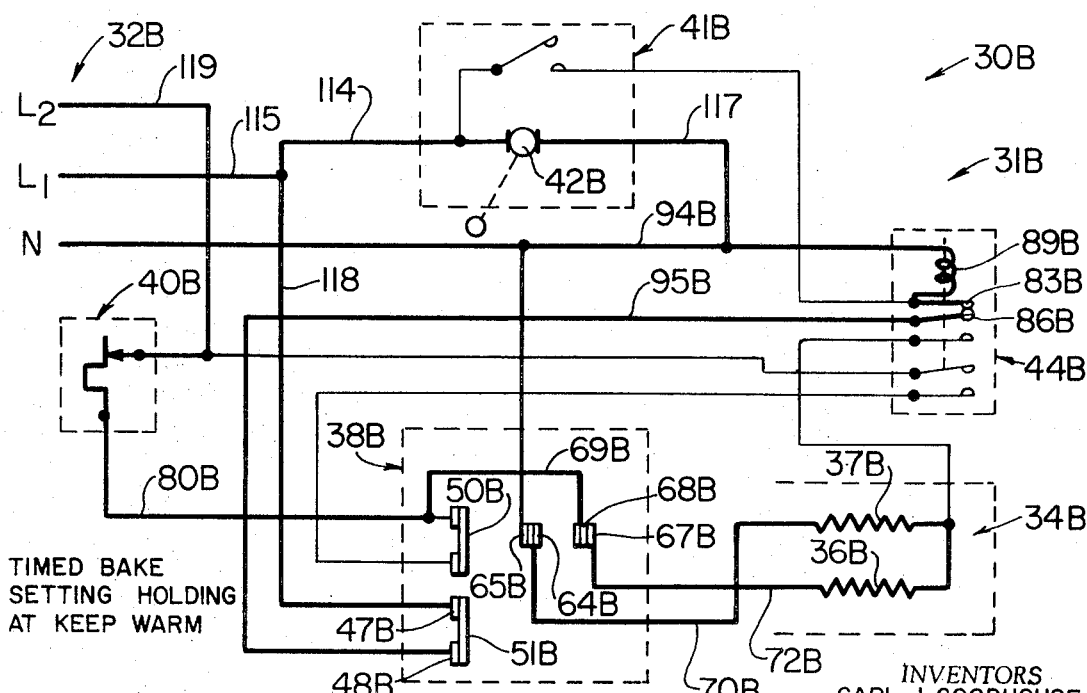
FIG. 16 is a view similar to FIG. 15 and illustrates the system of FIG. 13 at the end of its timed bake period where the system holds the oven at a keep warm and noncooking temperature.

Subsequently, the timer mechanism 42B automatically opens the movable contact 104B away from the fixed contact 98B as illustrated in FIG. 16 after the bridging members 50B and 51B are again bridging their respective pairs of contacts 45B, 46B and 47B, 48B whereby the coil 89B remains energized and the thermostatically operated switch means 40B cycles the heating elements 36B and 37B in series across the power source lead $L_2$ and neutral line N to tend to maintain the temperature in the oven 34B at the warmth retaining and noncooking temperature setting of the thermostatic means 40B in the manner previously described until the housewife or the like returns to turn off the thermostatic switch construction 38B.

CONTROL SYSTEM OF FIGS. 17—20

If it is desired to utilize the system 30B and unit 31B without the keep warm thermostatic means 40B, such means can be modified in the manner illustrated in FIGS. 17—20 wherein another embodiment of the control system is generally indicated by the reference numeral 30C and the control unit therefor is generally indicated by the reference numeral 31C, the parts of the system 30C and unit 31C of FIG. FIGS. 17—20 that are identical to the parts of the system 30B and unit 31B previously described being indicated by like reference numerals followed by the reference letter "C."

Figure 17:
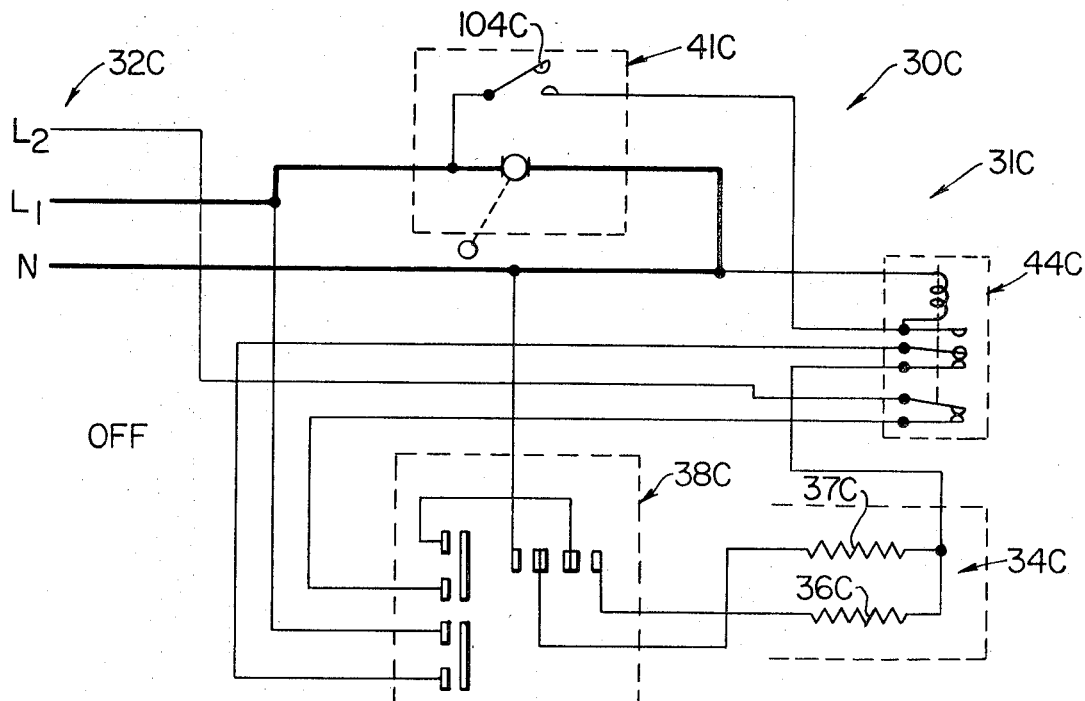
FIG. 17 is a view similar to FIG. 1 and illustrates another control system of this invention, the control system being in its off position.
Figure 18:
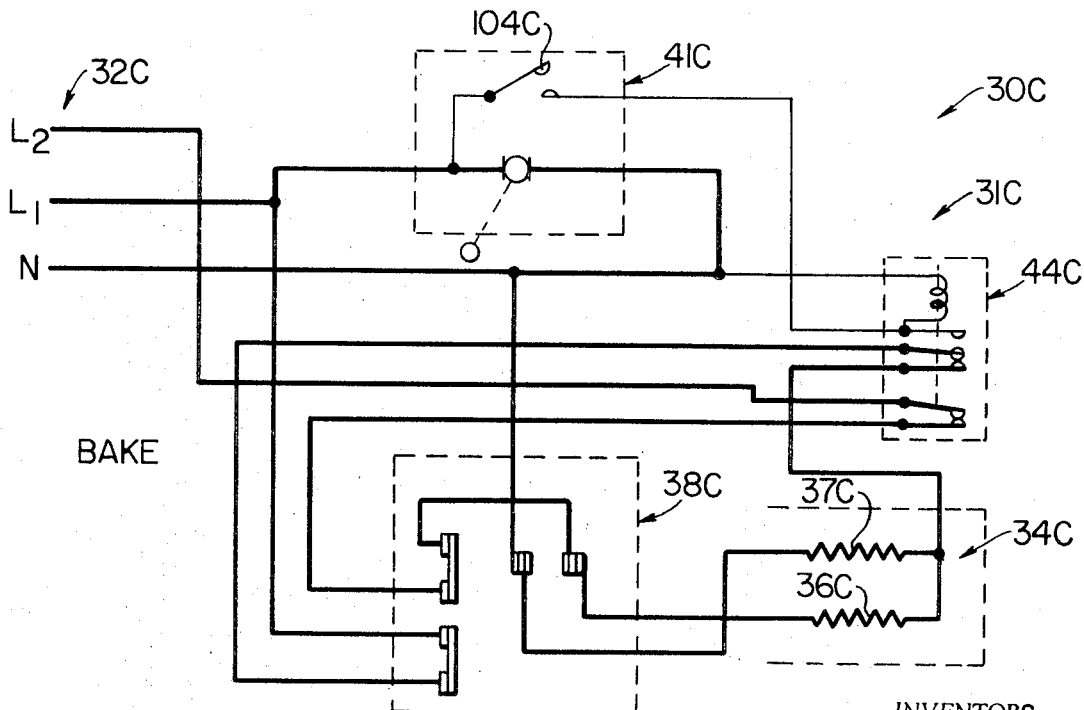
FIG. 18 is a view similar to FIG. 17 and illustrates the system of FIG. 17 in its bake position.

As illustrated in FIG. 17, it can be seen that the system 30C and unit 31C are identical to the system 30B and unit 31B except that the thermostatic means 40B has been completely eliminated therefrom so that following a timed baking operation as illustrated in FIG. 18, the system 30C will discontinue the operation of the heating means 36C and 37C as illustrated in FIG. 19 while energizing the coil 89C with such coil 89C remaining energized as illustrated in FIG. 20 when the movable contact 104C returns to its open position whereby the heating means 36C and 37C still remain unenergized since there is no thermostatic means 40B to control the heating element 36C and 37C following the timed baking operation.

Thus, it can be seen that this invention not only provides an improved control system for a cooking apparatus or the like, but also this invention provides an improved control unit for such a control system or the like.

We claim:

1. In a control system for a cooking oven having heating means, a source of electrical current, thermostatically operated switch means adapted to interconnect and disconnect said source to and from said heating means to tend to maintain a selected temperature output effect of said heating means in said oven when a selector means of said switch means is moved from an off position thereof to a selected on position thereof, the improvement comprising a timer operated switch means having a first position and a second position, said timer operated switch means having means for maintaining itself in its first position for a selected cooking time period and for automatically moving itself to its second position at the end of said time period and then back to its first position, relay switch means having a first position and a second position, and electrical circuit means operatively interconnecting said source with said heating means through said switch means, said relay switch means and said timer operated switch means when in said first positions cooperating together to interconnect said source to said heating means through said thermostatically operated switch means when said thermostatically operates switch means is in an on position thereof, said timer operated switch means having means for causing said relay switch means to move to its second position when said timer operated switch means automatically moves to its second position, said timer operated switch means and said relay switch means cooperating together to thereafter maintain said relay switch means in its said second position even though said timer operated switch means automatically moves back to its first position until said thermostatically operated switch means is turned to its off position by said selector means whereby said relay switch means then automatically moves back to its said first position.

2. In a control system as set forth in claim 1, the further improvement wherein said timer operated switch means has means for selecting a delayed start time thereof that causes said timer operated switch means to remain in a third position thereof during said delayed start time period after the lapse of which said timer operated switch means is automatically moved to said first position thereof for said selected cooking time period, said timer operated switch means when in said third position preventing said source from being interconnected to said heating means through said circuit means.

3. In a control system as set forth in claim 2, the further improvement wherein said selector means can be set for a baking operation of said heating means whereby said heating means will provide a baking operation during said selected cooking time period after the lapse of said delayed start time period of said timer operated switch means.

4. In a control system as set forth in claim 3, the further improvement wherein said circuit means has another thermostatically operated switch means therein which is adapted to interconnect and disconnect said source to and from said heating to tend to maintain a warmth-retaining and noncooking temperature in said oven when said selector means is set in a warmth-retaining and noncooking setting thereof and said timer operated switch means and said relay switch means are in said first positions thereof.

5. In a control system as set forth in claim 4, the further improvement wherein said relay switch means and said timer operated switch means cooperate together to interconnect said source to said heating means through said other thermostatically operated switch means following the end of said selected cooking time period when said timer operated switch means is back in its first position and said relay switch means is in its second position until said selector means moves said first-named thermostatically operated switch means to its off position.

6. In a control system as set forth in claim 3, the further improvement wherein said selector means can be set for a broiling operation of said heating means whereby said heating means will provide a broiling operation during said selected cooking time period after the lapse of said delayed start time period of said timer operated switch means.

7. In a control system as set forth in claim 1, the further improvement wherein said relay switch means when in said second position thereof prevents said source from being interconnected to said heating means.

8. In a control system as set forth in claim 1, the further improvement wherein said relay switch means has a first contact interconnected by said circuit means to one side of said heating means, said source comprising two power lines and a neutral line, said relay switch means having a second contact adapted to be interconnected to one of said power lines of said source by said circuit means, said relay switch construction when in said first position thereof holding said first and second contacts in contact with each other and when in said second position holding said first and second contacts out of contact with each other.

9. In a control system as set forth in claim 8, the further improvement wherein said relay switch means has a third contact disposed out of contact with said second contact when said relay switch means is in said first position thereof and disposed in contact with said second contact when said relay switch means is in said second position, said relay switch means having a solenoid means for moving and maintaining the same in its second position as long as said solenoid is energized, said third contact being interconnected to one side of said solenoid means and to a said neutral line by said circuit means.

10. In a control system as set forth in claim 9, the further improvement wherein said timer operated switch means has a first switch which is in the open position when said timer operated switch means is in said first position thereof and which is in its closed position when said timer operated switch means is in its second position, one side of said first switch being interconnected by said circuit means to one power line of said source, the other side of said first switch being interconnected to said third contact of said relay switch means whereby said solenoid means is placed across said one power line and said neutral line to energize the same when said timer operated means is in its second position.

11. In a control system as set forth in claim 10, the further improvement wherein said circuit means is adapted to interconnect said second contact of said relay switch means to one of said power lines of said source through said thermostatically operated switch means whereby said solenoid means remains energized to hold said relay switch means in its said second position after said timer operated switch means returns back to said first position thereof as long as said thermostatically operated switch means remains in a closed position thereof in an on condition thereof.

12. In a control system as set forth in claim 1, the further improvement wherein said heating means comprises a broil element and a bake element.

13. A control unit for a cooking oven having heating means and a source of electrical current, said unit comprising thermostatically operated switch means adapted to interconnect and disconnect said source to and from said heating means to tend to maintain a selected temperature output effect of said heating means in said oven when a selector means of said switch means is moved from an off position thereof to a selected on position thereof, a timer operated switch means having a first position and a second position, said timer operated switch means having means for maintaining itself in its first position for a selected cooking time period and for automatically moving itself to its second position at the end of said time period and then back to its first position, relay switch means having a first position and a second position, and electrical circuit means for operatively interconnecting said source with said heating means through said switch means, said relay switch means and said timer operated switch means being adapted when in said first positions thereof to cooperate together to interconnect said source to said heating means through said thermostatically operated switch means when said thermostatically operated switch means is in an on position thereof, said timer operated switch means having means adapted to cause said relay switch means to move to its second position when said timer operated switch means automatically moves to its second position, said timer operated switch means and said relay switch means being adapted to cooperate together to thereafter maintain said relay switch means in its said second position even though said timer operated switch means automatically moves back to its first position until said thermostatically operated switch means is turned to its off position by said selector means whereby said relay switch means then is adapted to automatically move back to its said first position.

14. A control unit as set forth in claim 13 wherein said timer operated switch means has means for selecting a delayed start time thereof that is adapted to cause said timer operated switch means to remain in a third position thereof during said delayed start time period after the lapse of which said timer operated switch means is adapted to automatically move to said first position thereof for said selected cooking time period, said timer operated switch means when in said third position being adapted to prevent said source from being interconnected to said heating means through said circuit means.

15. A control unit as set forth in claim 14 wherein said selector means can be set for a baking operation of said heating means whereby said heating means will provide a baking operation during said selected cooking time period after the lapse of said delayed start time period of said timer operated switch means.

16. A control unit as set forth in claim 15 wherein said circuit means has another thermostatically operated switch means therein which is adapted to interconnect and disconnect said source to and from said heating to tend to maintain a warmth-retaining and noncooking temperature in said oven when said selector means is set in a warmth-retaining and noncooking setting thereof and said timer operated switch means and said relay switch means are in said first positions thereof.

17. A control unit as set forth in claim 16 wherein said relay switch means and said timer operated switch means are adapted to cooperate together to interconnect said source to said heating means through said other thermostatically operated switch means following the end of said selected cooking time period when said timer operated switch means is back in its first position and said relay switch means is in its said second position until said selector means moves said first-named thermostatically operated switch means to its off position.

18. A control unit as set forth in claim 15 wherein said selector means can be set for a broiling operation of said heating means whereby said heating means will provide a broiling operation during said selected cooking time period after the lapse of said delayed start time period of said timer operated switch means.

19. A control unit as set forth in claim 13 wherein said relay switch means when in said second position thereof is adapted to prevent said source from being interconnected to said heating means.

20. A control unit as set forth in claim 13 wherein said relay switch means has a first contact adapted to be interconnected by said circuit means to one side of said heating means, said relay switch means having a second contact adapted to be interconnected to one of said power lines of a three line power source by said circuit means, said relay switch construction when in said first position thereof holding said first and second contacts in contact with each other and when in said second position holding said first and second contacts out of contact with each other.

21. A control unit as set forth in claim 20 wherein said relay switch means has a third contact disposed out of contact with said second contact when said relay switch means is in said first position thereof and disposed in contact with said second contact when said relay switch means is in said second position, said relay switch means having a solenoid means for moving and maintaining the same in its second position as long as said solenoid is energized, said third contact being interconnected to one side of said solenoid means and being adapted to be interconnected to the neutral line of said power source by said circuit means.

22. A control unit as set forth in claim 21 wherein said timer operated switch means has a first switch which is in the open position when said timer operated switch means is in said first position thereof and which is in its closed position when said timer operated switch means is in its second position, one side of said first switch being adapted to be interconnected by said circuit means to one power line of said source, the other side of said first switch being interconnected to said third contact of said relay switch means whereby said solenoid means is adapted to be placed across said one power line and said neutral in line to energize the same when said timer operated means is in its second position.

23. A control unit as set forth in claim 22 wherein said circuit means is adapted to interconnect said second contact of said relay switch means to one of said power lines of said source through said thermostatically operated switch means whereby said solenoid means is adapted to remain energized to hold said relay switch means in its said second position after said timer operated switch means returns back to said first position thereof as long as said thermostatically operated switch means remains in a closed position thereof in an on condition thereof.